US009178827B2

(12) United States Patent
Kaplan et al.

(10) Patent No.: US 9,178,827 B2
(45) Date of Patent: Nov. 3, 2015

(54) RATE CONTROL BY TOKEN BUCKETS (71) Applicant: International Business Machines Corporation, Armonk, NY (US)

(72) Inventors: Marc A. Kaplan, Bethel, CT (US); Anna S. Povzner, San Jose, CA (US)

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 122 days.

(21) Appl. No.: 13/958,841

(22) Filed: Aug. 5, 2013

(65) Prior Publication Data
US 2015/0036503 A1  Feb. 5, 2015

(51) Int. Cl.
*H04L 1/00* (2006.01)
*H04L 12/819* (2013.01)

(52) U.S. Cl.
CPC .................................. *H04L 47/215* (2013.01)

(58) Field of Classification Search
CPC ......... H04L 47/10; H04L 47/30; H04L 47/13; H04L 47/11; H04L 47/12; H04L 47/14; H04L 47/15
USPC .......................... 370/229–232, 235, 236, 412
See application file for complete search history.

(56) References Cited

U.S. PATENT DOCUMENTS

| 6,801,500 | B1 | 10/2004 | Chandran |
| 8,032,653 | B1* | 10/2011 | Liu et al. ................. 709/235 |
| 2008/0008095 | A1 | 1/2008 | Gilfix |
| 2008/0159135 | A1 | 7/2008 | Caram |
| 2010/0054125 | A1 | 3/2010 | Bernstein et al. |
| 2010/0246596 | A1* | 9/2010 | Nakamura et al. ............ 370/428 |
| 2010/0302942 | A1 | 12/2010 | Shankar et al. |

OTHER PUBLICATIONS

Mehra, A. et al., Design Considerations for Rate Control of Aggregated TCP Connections, 1999.
Method for Peak Rate Limiting in Network Processors, Apr. 23, 2007.
Eardley, P. et al., Metering and Marking Behaviour of PCN-Nodes, Nov. 24, 2009.

* cited by examiner

*Primary Examiner* — Dady Chery
(74) *Attorney, Agent, or Firm* — Andrew M. Calderon; Roberts Mlotkowski Safran & Cole, P.C.

(57) ABSTRACT

Aspects of the invention are provided for rate control and management of service requests. A token bucket is employed in conjunction with a capacity sharing scheme to manage processing of service requests. Each token represents the capacity reserved for a particular source of requests. Excess tokens may be shed, with the excess tokens representing available excess capacity. Similarly, a projected time at which the service request(s) may be released may be computed in the event the bucket does not contain the required quantity of tokens to process the request.

18 Claims, 6 Drawing Sheets

RATE CONTROL BY TOKEN BUCKETS

BACKGROUND

This invention relates to a rate control system in a system where it is desirable to control the rate of units of work per measure of time. More specifically, the invention is related to a demand driven model that performs a simple and precise scheduling computation for each service request.

Token bucket algorithms are metering engines that keep track of how much traffic can be sent to conform to specified traffic rates. A token, or in some cases a quantity of tokens, permits the algorithm to process a request. Tokens are granted at the beginning of a time increment according to a specified rate. Token buckets may be applied to resources of a network that are shared by multiple network devices, such as switches, routers, etc., where they are used to control data flow between network devices. Specifically, the token bucket employs credits in the form of tokens with the credits generally correlated to bandwidth.

BRIEF SUMMARY

This invention comprises a method, system, and computer program product for an on-demand request driven implementation of a token bucket for processing service requests.

A method, computer program product, and system are provided for maintaining a rate control mechanism in the form of a token bucket for a source of requests. The bucket accumulates tokens at a given rate until a counter representing the token bucket reaches a token burst size. Each bucket represents a share of resource capacity for processing a request. Responsive to receipt of a request, a quantity of accumulated tokens is assessed as a function of token bucket parameters. The request is serviced if the required quantity of tokens is accumulated. However, in the event the required number of tokens to process the request is not present in the bucket, a future time when the required quantity of tokens is anticipated to have been accumulated is computed.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A token represents a unit of service, and a token bucket represents a number of units of service. In one embodiment, the token bucket represents capacity reserved for a particular source of requests, including utilizing storage in support of read and/or write transactions. Each bucket is characterized by parameters and variables. In its basic form, the token bucket is characterized by two numeric parameters, including the maximum number of tokens the bucket may hold without overflowing, B, and the rate at which tokens are received by the bucket, R. More specifically, R represents the number of tokens per unit of time. At the same time, the state of the bucket is represented by two variables at a particular point in time, including the number of tokens in the bucket, b, at time t. In one embodiment, the variable t may represent past, present or future time. Initially, the variable t may be set to any convenient value that represents the current time or time in the past. Similarly, the variable b may be set to any value from 0 to B. Following the setting of the parameters of the bucket as represented by the variable, the bucket may be employed to regulate service requests.

Figure 1:
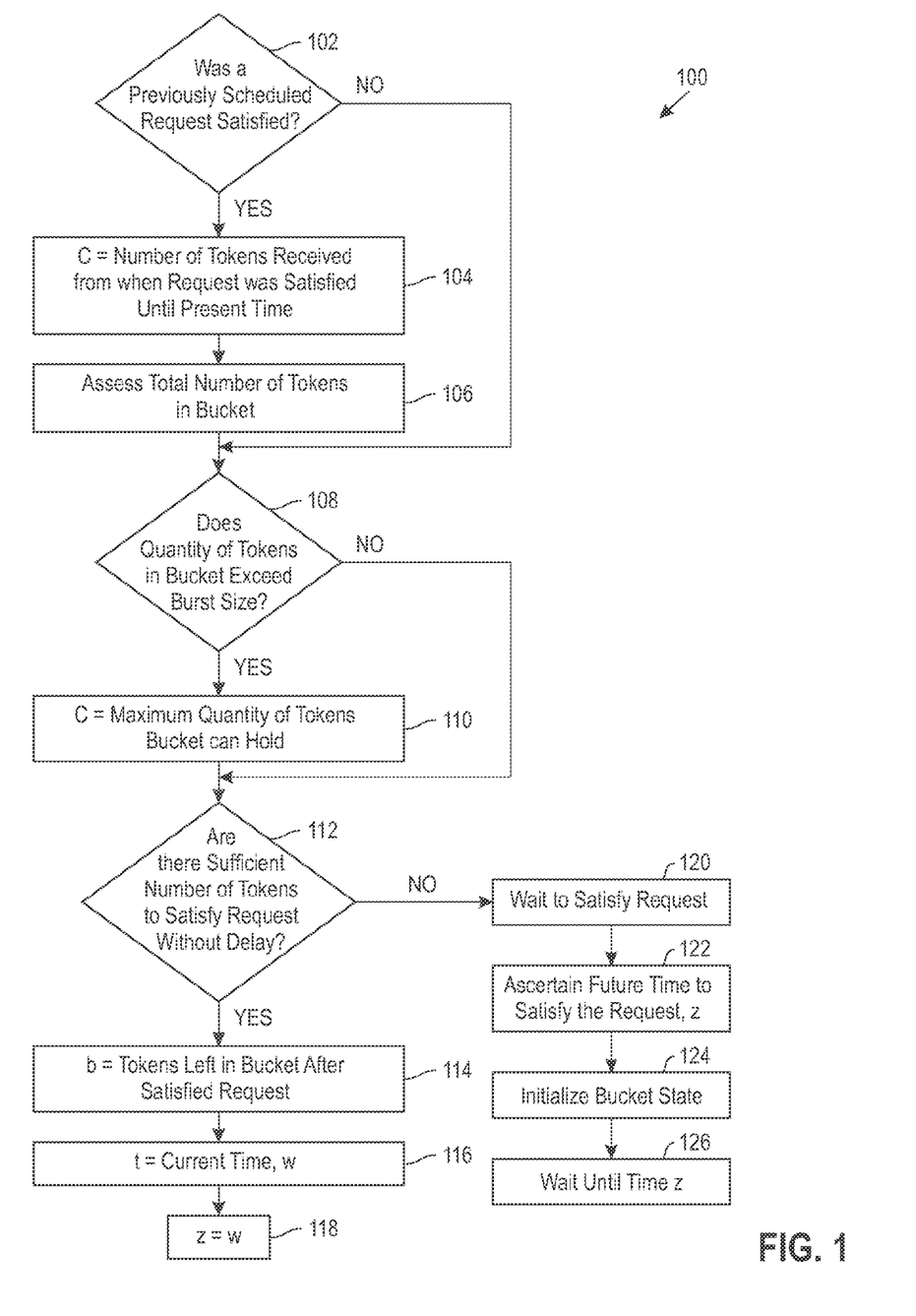
FIG. 1 depicts a flow chart illustrating a process for computing the earliest time at which a service request may take the required tokens from a token bucket.

A service request is characterized by two variables, including the current time, w, and the number of tokens, n, required to support the request. FIG. 1 is a flow chart (100) illustrating a process for computing the earliest time at which the service request may take the required tokens from the bucket, thereby allowing the service request to be processed, e.g. accessing data storage in support of the request. Initially, it is determined if a previously scheduled request was satisfied in the past (102). If the response to the determination is positive, the variable c is employed to represent the number of tokens received by the bucket from the time in the past when the scheduled request was satisfied until the present time (104), e.g. c =(w-t)*R. In addition, the total number of tokens in the bucket is assessed (106), e.g. c=b+c. Accordingly, the initial aspect of an on-demand implementation of the token bucket assesses satisfaction of a previously scheduled request.

Following completion of the assessments at steps (104) and (106) or a negative response to the determination at step (102), it is determined if the quantity of tokens in the bucket exceeds the maximum quantity of tokens that the bucket can hold (108), also referred to herein as a burst size of the bucket. A positive response to the determination at step (108) is an indication that some of the tokens have overflowed, and the variable c is assigned to the maximum quantity of tokens that the bucket can hold without overflowing (110), e.g. c=B. Following step (110) or a negative response to the determination at step (108), it is determined if the bucket contains enough tokens to proceed with satisfying the service request without delay (112). A positive response to the determination at step (112) enables the request to be satisfied on demand. Specifically, the number of tokens left over in the bucket is assigned to the variable b (114), e.g. b=c−n, and the request is satisfied by assigning the time variable, t, to the current time, w, (116) and assigning the variable z to the current time w (118). Accordingly, if it is determined that the bucket contains enough tokens to satisfy the request, the request is serviced immediately, e.g. on-demand.

The number of tokens in the bucket is a quantity that is in flux, and changes based upon servicing different requests and the rate at which the bucket receives tokens. A negative response to the determination at step (112) is an indication that the request must wait for a future time when the quantity of tokens in the bucket to satisfy the request are available (120). In one embodiment, the service request can gather the tokens it needs from the bucket while in the state of waiting, such as gathering tokens that may have otherwise overflowed the bucket. Following step (120) an assessment is conducted to ascertain the future time when the bucket will have enough tokens required to satisfy the request, e.g. z=t+(n−b)/R. The time variable t is then assigned to the assessed future time, z, (122), and the bucket state at time variable t is set to zero (124). Specifically, at steps (122) and (124), the bucket state at the assessed future time to satisfy the request will take and release the tokens in the bucket. The request must then wait until time z to satisfy the request and continue processing with data storage (126). At the time when the request is satisfied, the request is considered as having the required tokens. Accordingly, the future time for servicing a request is computed as a function of the required quantity of tokens, the quantity of accumulated tokens, the rate at which tokens are accumulated, and the time of a last computation.

As demonstrated in FIG. 1, a token bucket is employed to support on demand satisfaction of one or more service request in communication with data storage. The computation and the associated variables are described with integer value representation. In one embodiment, the variables may represent non-integer values. For example, the variable b may represent whole tokens left in the bucket, and the time to acquire the necessary number of tokens may be adjusted to the last time a whole number of tokens were available and in the bucket. Similarly, in one embodiment, the request is satisfied when the future time, z, the bucket has the whole number of tokens, w, to satisfy the request.

The process demonstrated in FIG. 1 shows the use of a single token bucket to satisfy and control satisfaction of a service request in communication with data storage. In one embodiment, the token bucket may be utilized to control the rate of communication, access to data storage, computing system, and any system where it is desirable to control the rate of units of work per measure of time. The token bucket scheme shown in FIG. 1 may be extended to an array of token buckets, with each individual bucket representing a share of the resource reserved by an application. In other words, the tokens are a fractional representation of shared capacity. Each bucket is represented by a counting variable, i, with $i_{Total}$ representing the total number of buckets in the array. The maximum number of tokens in each individual bucket is represented as B[i]. The rate of which tokens are received in each individual bucket is represented as R[i]. The skim line of each individual bucket is represented as S[i]. As described in FIG. 2, the skim line represents an attainment of maximum capacity in a specific bucket. When any bucket i in the array contains more than S[i] tokens, those in excess of the skim parameter may be used by any requester in the array. In numerical terms, tokens in excess of the skim line is the difference of the maximum number of tokens and the skim line, e.g. B[i]−S[i], with the value of S[i] constrained by B[i] being greater than or equal to S[i] and S[i] being greater than or equal to zero.

Figure 2:
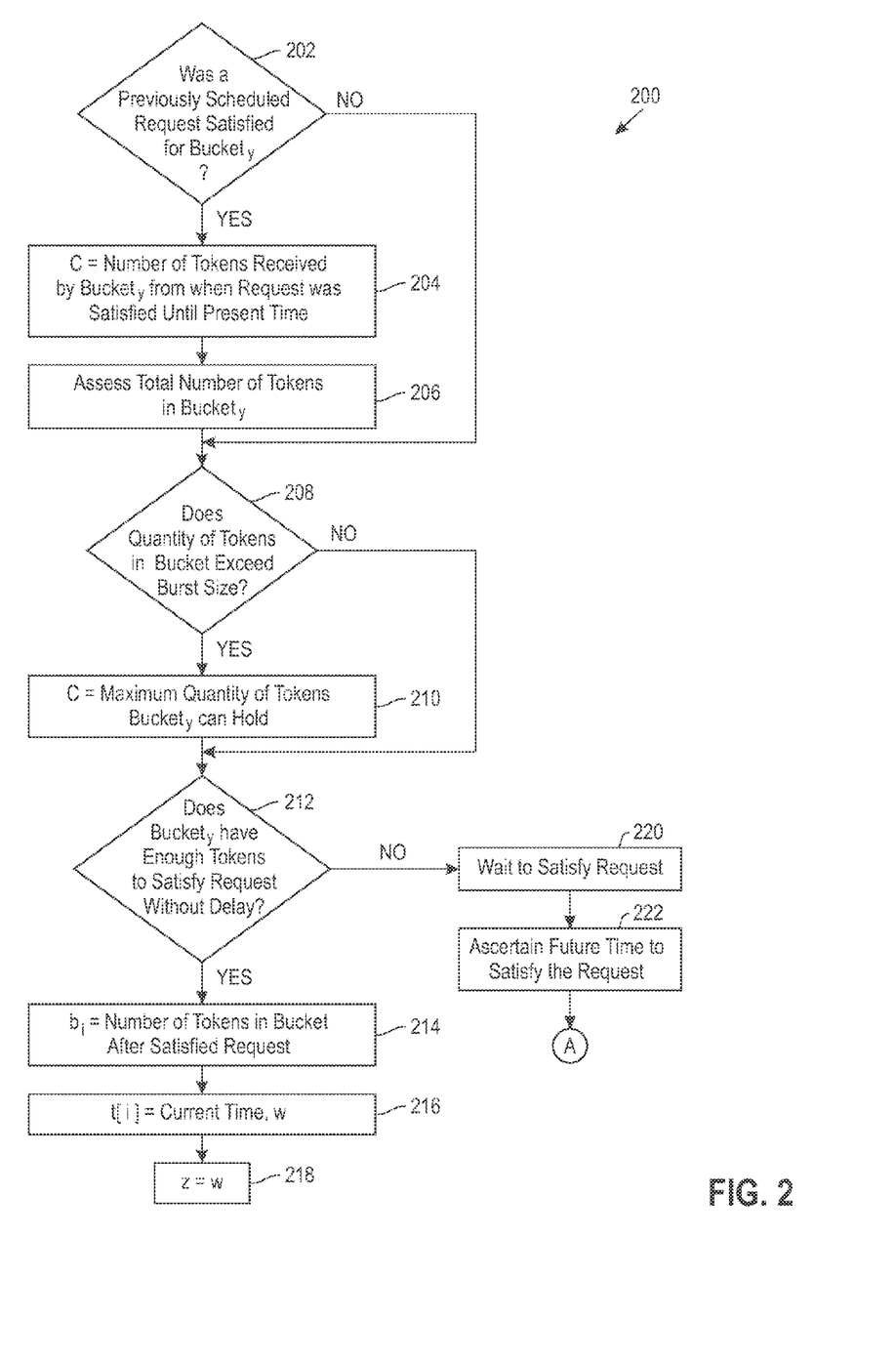
FIG. 2 depicts a flow chart illustrating a process for employing an array of token buckets to regulate a system of traffic sources.

Each bucket has two state variable, time and token account. Time is represented as t[i] and the token count is represented as b[i]. More specifically, the token count, b[i], represents the number of tokens bucket, can hold at time t[i]. Tokens that rise above the skim line of any bucket become available to any requester being serviced by the buckets in the array. Tokens can overflow individual buckets in the array, with the parameter that the long term average token rate cannot exceed the sum of the rates of the individual buckets in the array. Similarly, the array does not hold more tokens that the sum of all of the buckets in the array. However, any tokens unused by a particular resource for which they were reserved can be used by any other resource, individually or in combination, and at the same time avoiding the need to adjust individual bucket parameters in real-time.

An array of buckets can be used to regulate a system with a plurality of traffic sources. A service request is characterized by the current time, w, the number of tokens required, n, and the source identifier i. Since no single request from source i should exceed the guaranteed reserved size of its primary bucket, the number of tokens required should be constrained to be less than or equal to the maximum number of tokens in the bucket, B[i]. FIG. 2 is a flow chart (200) illustrating a process for employing an array of token buckets to regulate a system of traffic sources. In one embodiment, multiple buckets are used in the context of a single server, with each bucket representing a number of tokens reserved for a class of users that are sharing the single server. The variable c is assigned to zero, and will be employed to represent a number of tokens. It is determined if a previously scheduled request was satisfied by bucket[i] in the past (202). If the response to the determination at step (202) is positive, the variable c is assessed to represent the number of tokens received by bucket[i] from the time in the past when the scheduled request was satisfied until the present time (204), e.g. c=(w−t[i])*R[i]. In addition, the total number of tokens in bucket[i] is assessed (206), e.g. c=b[i]+c. Accordingly, the initial aspect of an on-demand implementation of the token bucket assesses satisfaction of a previously schedule request.

Following completion of the assessments at steps (204) and (206) or a negative response to the determination at step (202), it is determined if the quantity of tokens in bucket[i] exceeds the maximum quantity of tokens that the bucket can hold (208). A positive response to the determination at step (208) is an indication that some of the tokens have overflowed, and the variable c is assigned to the maximum quantity of tokens that bucket[i] can hold without overflowing (210), e.g. c=B[i]. Following step (210) or a negative response to the determination at step (208), it is determined if bucket[i] contains enough tokens to proceed with satisfying the service request without delay (212). A positive response to the determination at step (212) enables the request to be satisfied on demand. Specifically, the number of tokens left over in the bucket is assigned to the variable b (214), e.g. b[i]=c−n, and the request is satisfied by assigning the time variable, t[i], to the current time, w, (216) and assigning the variable z to the current time w (218). Accordingly, if it is determined that the bucket contains enough tokens to satisfy the request, the request is serviced immediately, e.g. on-demand.

The number of tokens in any one of the buckets in the array is a quantity that is in flux, and changes based upon servicing different requests and the rate at which the individual buckets receive tokens. A negative response to the determination at step (212) is an indication that the request must wait for a future time when the quantity of tokens in the bucket to satisfy the request are available (220). In one embodiment, the service request can gather the tokens it needs from the bucket while in the state of waiting, such as gathering tokens that may have otherwise overflowed the bucket. Following step (220), an assessment is conducted to ascertain the future time when the bucket will have enough tokens required to satisfy the request, e.g. z=t[i]+(n−b[i])/R[i], and a calculation of the number of tokens the bucket need to satisfy the request (222), perhaps from skimming tokens from other buckets in the array. Accordingly, with the array of buckets, tokens may be skimmed within the array to satisfy one or more service requests.

Individual buckets in the bucket array operate in conjunction with other buckets in the array. More specifically, one bucket may be servicing one request while a second bucket is servicing a second request. At the same time, the aspect of skimming tokens employs the array, such that each bucket is assessed for tokens to spare. The number of buckets in the array is defined as $J_{Total}$ (224), and an associated counting variable, j, is initialized (226). The bucket in need of tokens, B[i], searches the next bucket j in the array for availability of tokens for skimming (228). It is then determined if the bucket searching the array has enough tokens to process their pending request (230). A negative response to the determination at step (230) is followed by an increment of the counting variable j (232), and a subsequent determination of whether all of the buckets in the array have been searched (234). A negative response to the determination at step (234) is followed by a return to step (228), and a positive response to the determination at step (234) is followed by a return to step (226) so that the bucket in need of excess tokens may continue to skim excess tokens as each bucket continues to receive tokens on demand and may have acquired excess tokens during the time interval between searches.

While looking at all of the buckets in the array, it is determined if a previously scheduled request was satisfied in the past (236). A positive response to the determination at step (236) is followed by assigning the number of tokens in the bucket to the variable e (238), e.g. e=b[j]+(w−t[j]*R[j]). It is then determined if the number of tokens in the bucket, e, is greater than the maximum number of tokens $bucket_j$ can hold (240). If the response to the determination at step (240) is positive, then $bucket_j$ is at capacity, and the number of tokens in the bucket, e, is set to the capacity of the bucket (242). However, if the response to the determination at step (232) is negative, then it is determined if $bucket_j$ has enough tokens over the skim line to satisfy the request (244). A positive response to the determination at step (244) is following by skimming tokens from $bucket_j$ (246) and updating the state of bucket j (248). In one embodiment, the skim line on one or more of the buckets in the array could be set to zero, indicating that any and all of the tokens may be skimmed at any time.

A bucket with a skim line at zero would be a bucket representing completely shareable capacity.

It is understood that only tokens above the skim line of a bucket in the array may be skimmed. More specifically, the bucket from which the tokens are being acquired cannot be left empty. As such, only tokens above the skim line may be acquired. If at step (244) it is determined that $bucket_j$ does not have enough tokens for skimming, the process returns to step (232) to assess the next bucket in the array. Accordingly, each of the buckets in the array, including the bucket subject to the request, is investigated for tokens to satisfy the request.

Tokens are dripped into the individual buckets of the array at a rate, e.g., conversely, the buckets receive tokens at the same rate. At the same time, more than one bucket in the array may be seeking tokens from other buckets in the array. As such, the array must be monitored and reviewed to seek tokens to satisfy one or more requests, when necessary. In contrast to the single bucket scenario, it is challenging to predict the earliest time the request will be satisfied. For example, in one embodiment, tokens may be skimmed from multiple buckets to satisfy a single request. More specifically, the required tokens to satisfy the request may be collected from more than one bucket in the array. Furthermore, as demonstrated in FIG. 2, the process of skimming buckets is shown to start with the first bucket in the array. In one embodiment, the process of skimming tokens from one or more buckets in the array may start at any bucket in the array and is not limited to the first bucket. Similarly, in one embodiment, the search for excess tokens across the array may start with a different token bucket each time the search begins. In another embodiment, the order in which the buckets in the array are searched may be altered so that buckets are searched in a different order than a prior search. The variations of use of the token bucket array may be employed individually or selectively combined.

As shown and described in FIG. 2, the array of token buckets enables skimming excess tokens within the array, with parameters to ensure equity within the array. The array of token buckets functions as a unit to control multiple sources of requests, with each bucket representing a share of resource capacity. In one embodiment, one or more buckets within the array may be dedicated to a particular source or set of sources. To support the dedication of buckets, one or more of the skim line values of the buckets, S[i], are set to their respective maximum number of tokens the bucket may hold, B[i]. Furthermore, as shown and described in FIG. 2, a plurality of buckets may be arranged in an array to support skimming and sharing of excess tokens. In one embodiment, the array of buckets may be partitioned into two or more groups. The partition enables sharing of tokens to be constrained group wise. In one embodiment, the partitioning of the array constrains sharing of tokens on an intra-partition basis. Similarly, in one embodiment, the partitioning may be replaced with application specific instructions to designate and limit which sources can skim tokens from which buckets. Accordingly, the buckets and skimming of excess tokens may be regulated in various manners.

Figure 3:
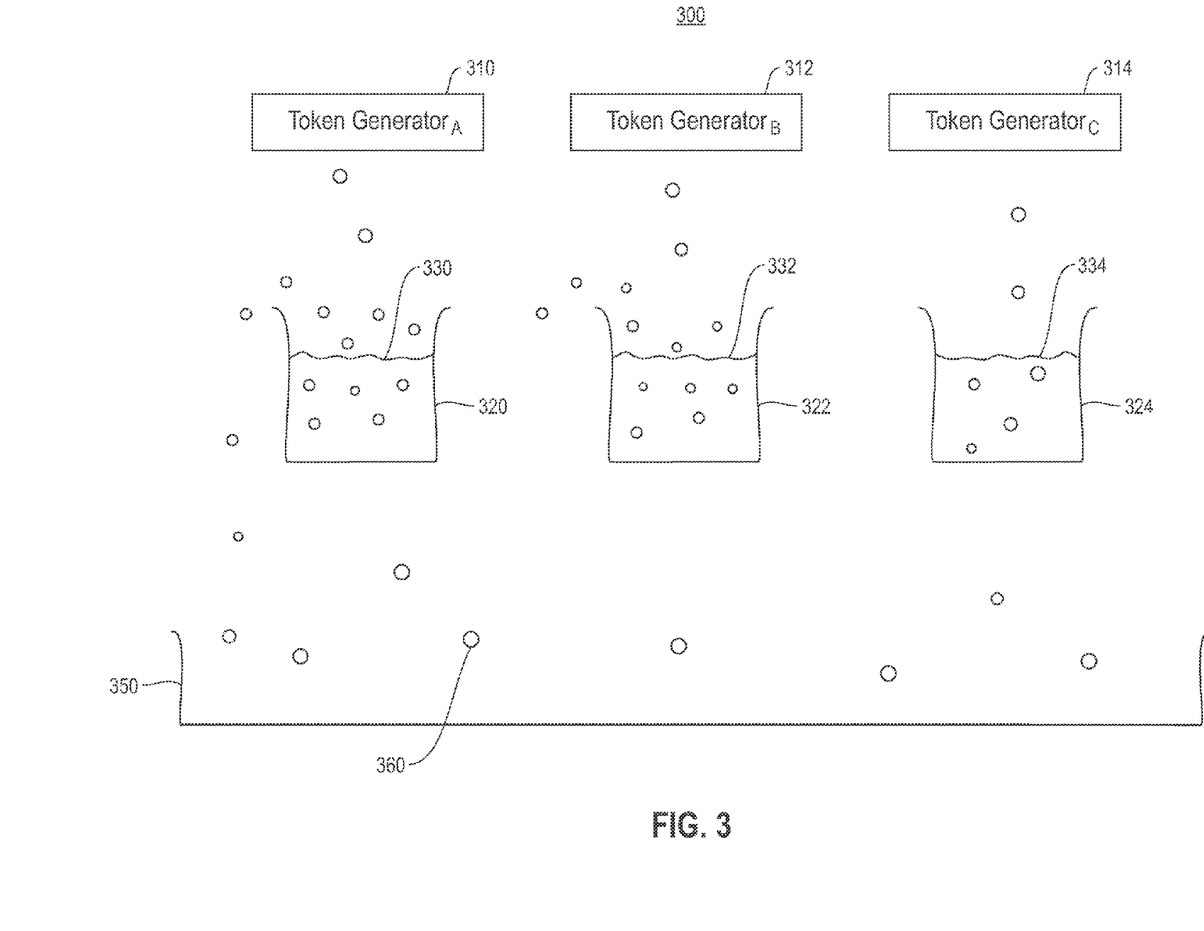
FIG. 3 depicts a block diagram illustrating a plurality of workloads that are in communication with an array of buckets.

As shown in FIG. 2, the request may seek overflow tokens from buckets within the array. In one embodiment, a catch basin may be employed for sharing excess tokens. FIG. 3 is a block diagram (300) illustrating a plurality of token generators and an array of buckets in communication with a catch basin. In the example shown herein, there are three token generators (TG), $TG_A$ (310), $TG_B$ (312) and $TB_C$ (314). Each of the token generators is in direct communication with a respective bucket. As shown, $TG_A$ (310) is in communication with $bucket_A$ (320), $TG_B$ (312) is in communication with bucket$_B$ (322), and TB$_C$ (314) is in communication with bucket$_C$ (324). The token generators for each bucket produce tokens at the same or different rates. Each of the buckets is shown with a skim line as follows: bucket$_A$ (320) has skim line$_A$ (330), bucket$_B$ (322) has skim line$_B$ (332), and bucket$_C$ (324) has skim line$_C$ (334). In one embodiment, the skim lines for each of the respective buckets may be at the same level, and similarly, in one embodiment, the skim lines for each of the respective buckets may be at different levels. A catch basin (350) is provided in communication with the array of buckets (320), (322), and (324). As any one of the buckets in the array acquires tokens (360) that exceed their respective capacity, e.g. that exceed the skim line, the excess tokens are received in the catch basin (350). Similarly, token that are below the respective skim line are reserved for the respective bucket. In the example shown herein, bucket$_A$ (320) and bucket$_B$ (322) are shown with tokens in excess of their respective skim lines (330) and (332), respectively, and as such, the tokens (360) are shown in each of these buckets dripping into the catch basin (350). At the same time, bucket$_C$ (324) is shown with received tokens below the skim line (334), and as such, the tokens in bucket$_C$ (324) are not dripping into or otherwise being received by the catch basin (350). In another example, workloads in class A may dip into bucket$_A$ (320) and a respective dipper (not shown) may remove tokens from bucket$_A$ (320) to support a service request. If there are not enough tokens available in bucket$_A$ (320) to support the service request, the dipper may acquire additional tokens from the catch basin (350), if available. Accordingly, the catch basin (350) represents short term unused capacity that would be available for sharing of excess tokens among buckets in the array.

Figure 4:
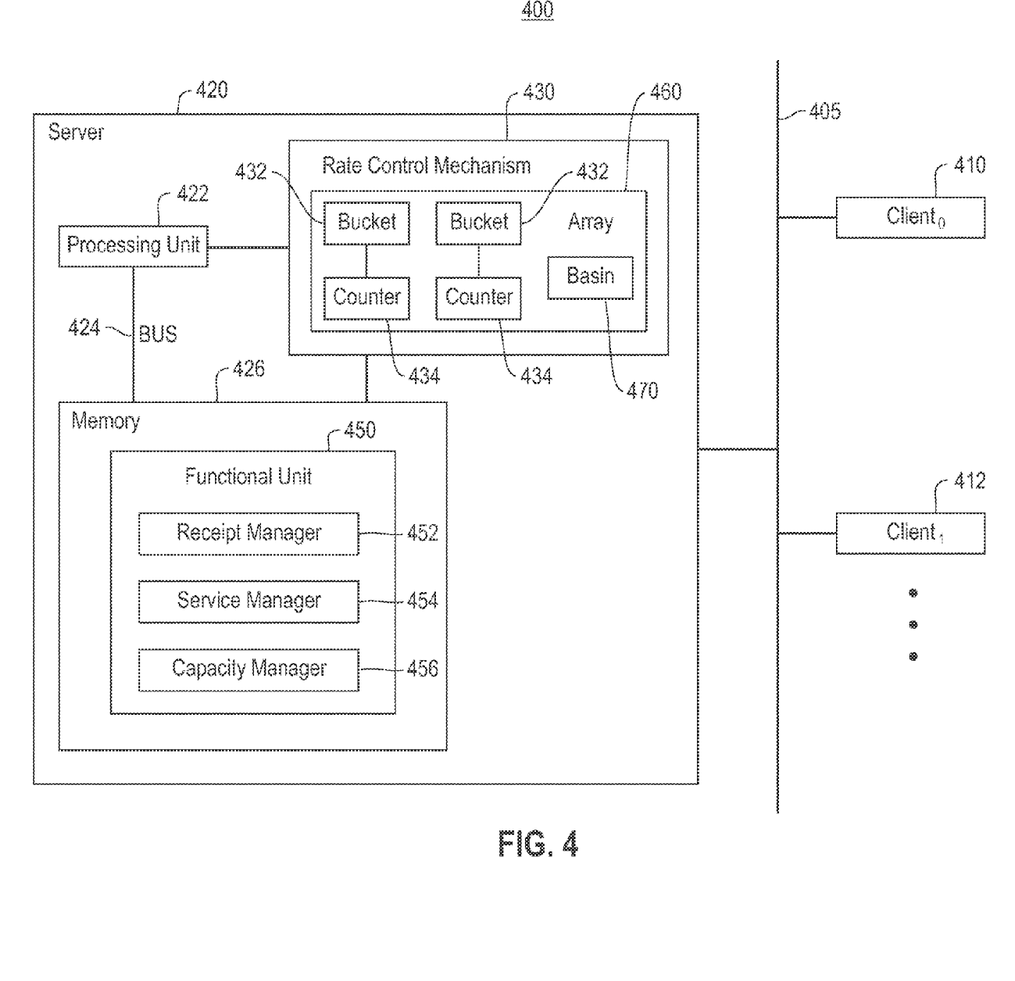
FIG. 4 depicts a block diagram illustrating tools embedded in a computer system to support rate control and sharing the aspect of skimming tokens from buckets in order to control service requests.

The processes shown in FIGS. 1-3 may be embodied as hardware components. FIG. 4 is a block diagram (400) illustrating tools embedded in a computer system to support rate control and sharing the aspect of skimming tokens from buckets in order to control service requests. As shown, a server (420) is provided in communication with one or more client machines (410) and (412) across a network connection (405). As one or more requests are received, a rate control mechanism in the form of a token bucket is employed to manage processing of the requests. More specifically, the server (420) is provided with a processing unit (422) in communication with memory (426) across a bus (424). The server (420) includes tools to support the rate control. As shown, a rate control mechanism (430) is shown in communication with the memory (426), although in one embodiment, it may be embedded within memory (426). The rate control mechanism (430) includes a token bucket (432) represented by and in communication with a counter (434). The bucket (432) accumulates tokens at a given rate. The counter (434) functions to assess or otherwise count the quantity of tokens in the bucket (432) at any given time. The counter (434) represents how many tokens are current in the bucket. As noted above, the bucket (432) has a burst size, which represents the maximum quantity of tokens the bucket (432) can hold. In one embodiment, the counter (434) is updated on demand at the time a new request arrives. For example, the counter (434) may be updated in response to receiving a request so that the counter will reflect the amount of tokens that would be accumulated since the last request. If the request needs to be serviced in the future, the counter (434) may be updated to reflect a calculation of how many additional tokens will accumulate at the time when the request will be serviced. Accordingly, the token bucket counter (434), which is a representation of the quantity of tokens in the bucket, is updated on demand in response to receipt of a request.

The server (420) is shown with a functional unit (450) with embedded managers to support processing of requests, with the functional unit in communication with both the rate control mechanism (430) and the processing unit (422). The managers include but are not limited to, a receipt manager (452), a service manager (454), and a capacity manager (456). The receipt manager (452) functions in conjunction with the processing unit (422) to compute a quantity of accumulated tokens as a function of one or more parameters of the bucket (432) in response to receipt of a request. The service manager (454) services the request based on an assessment of the bucket (432) by the receipt manager (452). More specifically, each request will have an associated quantity of tokens required for processing the request. The quantity of tokens may be based on characteristics of the request, the network, etc. The service manager (454) services the request if the quantity of tokens required to service the request are accumulated and present in the bucket (432). However, in the event that the bucket does not contain the requisite number of tokens, the service manager (454) may compute a future time when the requisite number of tokens will be available based on the current state of the bucket and the rate at which the bucket receives tokens, as demonstrated in FIG. 2. As noted above, the bucket (432) accumulates tokens on demand and at a given rate. Accordingly, barring receipt of any other requests, the time when the quantity of tokens will be available can be assessed.

The tools described above enable processing of requests based on system parameters. More specifically, the token bucket (432) and the rate at which it receives tokens are based on system parameters, such as bandwidth and storage. However, the system is not static and may be processing more than one request at a time. The receipt manager (452) computes a quantity of accumulated tokens as a function of bucket parameters. Such parameters include, but are not limited to, the rate at which tokens are accumulated, a burst size of the bucket, the time of last computation of available tokens, and the quantity of tokens remaining in the bucket since the last computation. Circumstances may yield a sufficient quantity of tokens available to satisfy the request, while circumstances may yield the inverse. In the event there are not enough tokens available, the receipt manager (452) computes a time in the future when the request may be serviced. As indicated, the bucket receives tokens at a set rate. Therefore the request manager (452) may employ several known and available factors to compute the time in the future, the factors including, but not limited to, the required number of tokens to satisfy the request, the quantity of accumulated tokens, the rate at which tokens are accumulated, and the time of the last computation. Accordingly, the receipt manager (452) functions to process requests based upon the parameters of the token bucket.

As described above, the rate control mechanism (430) is described above with one token bucket (432) to process read and write requests. In one embodiment, the rate control mechanism (430) may be expanded to include an array (460) of token buckets (432). Although two token buckets (432) and associated counter (434) are shown in the array (460), the quantity of token buckets shown should not be considered limiting. The buckets (432) in the array (460) function together as a unit to control multiple sources of requests and to share resource capacity. Specifically, each bucket (432) individually represents a share of resource capacity. The capacity manager (456) functions to support capacity driven sharing of tokens in the array (460). More specifically, the capacity manager (456), which is in communication with the service manager (454), addresses overflow of tokens in the array (450). The capacity manager (456) functions to assign an overflow size to each bucket (432) so that the buckets may share excess or unused capacity within the array. Each of the buckets (432) measures available excess tokens and may assign a reserved burst size that is smaller than the burst size of the bucket, so that tokens above the reserved burst size may be made available to other buckets in the array (460). Accordingly, the capacity manager (456) enhances sharing of tokens among the buckets in the array.

In addition to the buckets (432), a catch basin (470) is provided in the array (460). The catch basin (470) represents short term unused capacity within the array. More specifically, the capacity manager (456) overflows unused tokens with the array into the catch basin (470). Any one of the buckets (432) in the process of servicing a request and is short on the required number of tokens, may seek use of any available tokens in the catch basin (470). Accordingly, the catch basin (470) functions to address sharing of unused tokens within the array (460).

As identified above, the receipt manager (452), service manager (454), and capacity manager (456) is shown residing in memory (426) of the server (420). Although in one embodiment, the managers (452)-(456), respectively, may reside as hardware tools external to the memory (426). In another embodiment, the managers (452)-(456), respectively, may be implemented as a combination of hardware and software. Similarly, in one embodiment, the managers (452)-(456) may be combined into a single functional item that incorporates the functionality of the separate items. As shown herein, each of the manager(s) (452)-(456) are shown local to the server (420) and in communication with the processing unit (422). However, in one embodiment they may be collectively or individually distributed across a shared pool of configurable computer resources and function as a unit to support processing of requests. Accordingly, the managers may be implemented as software tools, hardware tools, or a combination of software and hardware tools.

Furthermore, the described features, structures, or characteristics may be combined in any suitable manner in one or more embodiments. Examples of the director and managers have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit(s) described above in FIG. 4 has been labeled with managers. The managers may be implemented in programmable hardware devices such as field programmable gate arrays, programmable array logic, programmable logic devices, or the like. The manager(s) may also be implemented in software for processing by various types of processors. An identified director or manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 5:
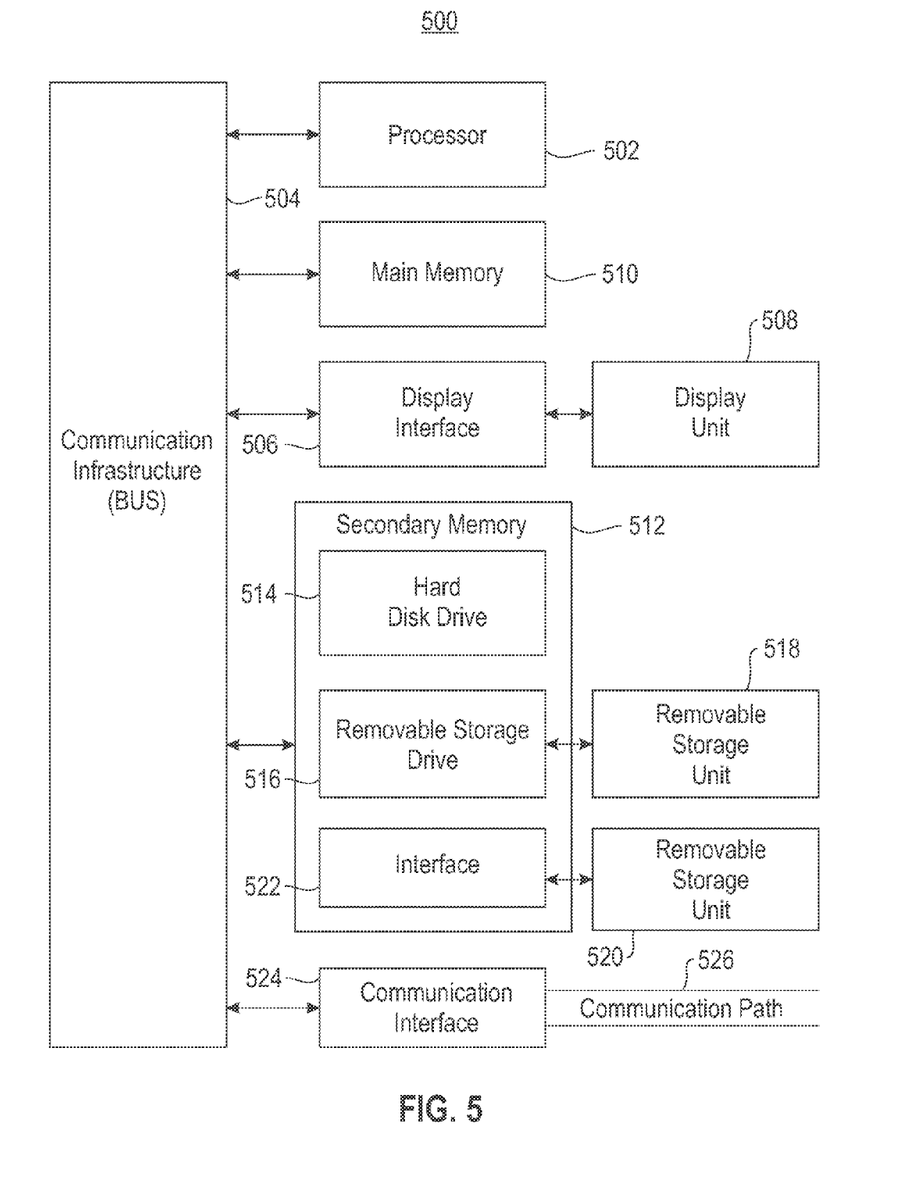
FIG. 5 depicts a block diagram of a computing environment according to an embodiment of the present invention.

Referring now to the block diagram (500) of FIG. 5, additional details are now described with respect to implementing an embodiment of the present invention. The computer system includes one or more processors, such as a processor (502). The processor (502) is connected to a communication infrastructure (504) (e.g., a communications bus, cross-over bar, or network).

The computer system can include a display interface (506) that forwards graphics, text, and other data from the communication infrastructure (504) (or from a frame buffer not shown) for display on a display unit (508). The computer system also includes a main memory (510), preferably random access memory (RAM), and may also include a secondary memory (512). The secondary memory (512) may include, for example, a hard disk drive (514) and/or a removable storage drive (516), representing, for example, a floppy disk drive, a magnetic tape drive, or an optical disk drive. The removable storage drive (516) reads from and/or writes to a removable storage unit (518) in a manner well known to those having ordinary skill in the art. Removable storage unit (518) represents, for example, a floppy disk, a compact disc, a magnetic tape, or an optical disk, etc., which is read by and written to by removable storage drive (516). As will be appreciated, the removable storage unit (518) includes a computer readable medium having stored therein computer software and/or data.

In alternative embodiments, the secondary memory (512) may include other similar means for allowing computer programs or other instructions to be loaded into the computer system. Such means may include, for example, a removable storage unit (520) and an interface (522). Examples of such means may include a program package and package interface (such as that found in video game devices), a removable memory chip (such as an EPROM, or PROM) and associated socket, and other removable storage units (520) and interfaces (522) which allow software and data to be transferred from the removable storage unit (520) to the computer system.

The computer system may also include a communications interface (524). Communications interface (524) allows software and data to be transferred between the computer system and external devices. Examples of communications interface (524) may include a modem, a network interface (such as an Ethernet card), a communications port, or a PCMCIA slot and card, etc. Software and data transferred via communications interface (524) is in the form of signals which may be, for example, electronic, electromagnetic, optical, or other signals capable of being received by communications interface (524). These signals are provided to communications interface (524) via a communications path (i.e., channel) (526). This communications path (526) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (510) and secondary memory (512), removable storage drive (516), and a hard disk installed in hard disk drive (514).

Computer programs (also called computer control logic) are stored in main memory (510) and/or secondary memory (512). Computer programs may also be received via a communication interface (524). Such computer programs, when run, enable the computer system to perform the features of the present invention as discussed herein. In particular, the computer programs, when run, enable the processor (502) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the on demand accumulation of tokens supports a demand driven model for rate control that enables precision with respect to scheduling of service requests.

Alternative Embodiment

It will be appreciated that, although specific embodiments of the invention have been described herein for purposes of illustration, various modifications may be made without departing from the spirit and scope of the invention. In one embodiment, a software implementation may require the use of locks and/or critical sections to satisfy the read and/or write request with data storage or related methods to control access to state variables, so as to operate in a multi-threaded or multi-tasking computing system. Similarly, the rate control may be in the form of units of work per measure of time, including packets per second, operations per second, bytes per second, service requests per second, pages per second, etc. Accordingly, the scope of protection of this invention is limited only by the following claims and their equivalents.

We claim:

1. A method comprising:
maintaining a rate control mechanism for a source of requests, the rate control mechanism including a token bucket represented by a counter;
the bucket accumulating tokens at a given rate until the counter reaches a token bucket burst size;
in response to receiving a request, the request associated with a unit of work rate per measure of time, computing a quantity of accumulated tokens as a function of token bucket parameters, wherein the token bucket parameters include the rate at which tokens are accumulated, a burst size of the bucket, time of a last computation, and a quantity of tokens remaining since the last computation;
updating the counter on demand, and computing a time for granting the received request based on the updated counter; and
servicing the request if the required quantity of tokens are accumulated, and computing a future time when the required quantity of tokens will be accumulated if the required quantity of tokens are unavailable.

2. The method of claim 1, further comprising computing future time for servicing a request as a function of the required quantity of tokens, the quantity of accumulated tokens, rate at which tokens are accumulated, and time of a last computation.

3. The method of claim 1, further comprising an array of token buckets functioning as a unit that controls multiple sources of requests, each bucket representing a share of resource capacity.

4. The method of claim 3, further comprising capacity driven sharing of tokens in the array, including assigning an overflow size to each bucket in the array and sharing excess or unused capacity within the array, including each bucket in the array measuring available excess tokens, and for each bucket assigning a reserved burst size smaller than a burst size of the buckets and tokens above the reserved burst size available to other buckets in the array.

5. The method of claim 4, further comprising partitioning the array, and constraining sharing of tokens in an intra-partition basis.

6. The method of claim 3, further comprising overflowing unused tokens of the array into a catch basin, the basin representing short term unused capacity available for sharing with the array.

7. The method of claim 3, further comprising skimming unused tokens from buckets in the unit with shareable capacity.

8. A computer program product for managing rate control of requests, the computer program product comprising a computer readable storage device having program code embodied therewith, the program code executable by a processor to:
maintain a rate control mechanism for a source of requests, the rate control mechanism including a token bucket represented by a counter;
the bucket to accumulate tokens at a given rate until the counter reaches a token bucket burst size;
in response to receiving a request, the request associated with a unit of work rate per measure of time, compute a quantity of accumulated tokens as a function of token bucket parameters, wherein the token bucket parameters include the rate at which tokens are accumulated, a burst size of the bucket, time of a last computation, and a quantity of tokens remaining since the last computation;
update the counter on demand, and compute a time to grant the received request based on the updated counter; and
service the request if the required quantity of tokens are accumulated, and compute a future time when the required quantity of tokens will be accumulated if the required quantity of tokens are unavailable.

9. The computer program product of claim 8, further comprising program code to compute future time for servicing the request as a function of the required quantity of tokens, the quantity of accumulated tokens, rate at which tokens are accumulated, and time of a last computation.

10. The computer program product of claim 8, further comprising program code to support an array of token buckets functioning as a unit that controls multiple sources of requests, each bucket representing a share of resource capacity.

11. The computer program product of claim 10, further comprising program code to support capacity driven sharing of tokens in the array, including assigning an overflow size to each bucket in the array and sharing excess or unused capacity within the array, including each bucket in the array measuring available excess tokens, and for each bucket assigning a reserved burst size smaller than a burst size of the buckets and tokens above the reserved burst size available to other buckets in the array.

12. The computer program product of claim 10, further comprising program code to overflow unused tokens of the array into a catch basin, the basin representing short term unused capacity available for sharing with the array.

13. The computer program product of claim 10, further comprising program code to skim unused tokens from buckets in the unit with shareable capacity.

14. A method comprising:
maintaining a rate control mechanism for a source of requests, the rate control mechanism including two or more token buckets functioning as a unit for managing multiple sources of requests, each bucket representing a share of resource capacity;
each of the buckets accumulating tokens at a given rate;
in response to receiving a request, computing a quantity of accumulated tokens as a function of token bucket parameters, wherein the token bucket parameters include the rate at which tokens are accumulated in each bucket, a burst size of each bucket, time of a last computation, and a quantity of tokens remaining in each bucket since the last computation;
updating a token bucket counter on demand;
servicing a request if the required quantity of tokens are accumulated; and
computing availability of excess tokens within the unit if the required quantity of tokens are unavailable, including sharing excess or unused capacity within the unit.

15. The method of claim 14, further comprising overflowing unused tokens within the unit into a shared bin, wherein tokens within the bin are available to each of the buckets in the unit to service the request.

16. The method of claim 15, wherein overflowing unused tokens includes each bucket in the unit measuring available excess tokens, and for each bucket assigning a reserved burst size smaller than a burst size of the buckets and tokens above the reserved burst size available to other buckets in the array.

17. The method of claim 14, further comprising computing a future time when the required quantity of tokens will be accumulated if the required quantity of tokens are unavailable in a bucket servicing the request and in the bin.

18. The method of claim 14, further comprising skimming unused tokens from buckets in the unit with shareable capacity.

* * * * *